United States Patent [19]

Owaki et al.

[11] Patent Number: 4,533,964
[45] Date of Patent: Aug. 6, 1985

[54] MULTI-TRACK DIGITAL RECORDING AND PLAYBACK SYSTEM

[75] Inventors: Isao Owaki, Tokyo; Susumu Saito, Sagamihara; Masami Yamazaki, Zama, all of Japan

[73] Assignee: Victor Company of Japan, Limited, Japan

[21] Appl. No.: 432,384

[22] Filed: Sep. 30, 1982

[30] Foreign Application Priority Data

Oct. 15, 1981 [JP]  Japan .................................. 56-164500

[51] Int. Cl.$^3$ ....................... G11B 15/02; G11B 5/43; G11B 5/09
[52] U.S. Cl. ...................................... 360/22; 360/26; 360/51
[58] Field of Search ........................ 360/22, 26, 51, 32

[56] References Cited

U.S. PATENT DOCUMENTS

| | | | |
|---|---|---|---|
| 4,146,099 | 3/1979 | Matsushima et al. | 340/146.1 |
| 4,211,997 | 7/1980 | Rudnick et al. | 340/146.1 |
| 4,238,852 | 12/1980 | Iga et al. | 360/32 |
| 4,274,115 | 6/1981 | Wada et al. | 360/32 |
| 4,323,931 | 4/1982 | Jacoby | 360/40 |
| 4,376,268 | 3/1983 | Moriya et al. | 360/51 |

FOREIGN PATENT DOCUMENTS

| | | | |
|---|---|---|---|
| 0048933 | 4/1982 | European Pat. Off. | 340/146.1 |
| 2827826 | 1/1980 | Fed. Rep. of Germany | 360/32 |
| 2358786 | 2/1978 | France | 340/146.1 |
| 2056206 | 3/1981 | United Kingdom | 340/146.1 |

OTHER PUBLICATIONS

D. Thomson, Digitale Audiotechnik, 1983, Franzis-Verlag GmbH, Munich, pp. 80/81.

*Primary Examiner*—Vincent P. Canney
*Attorney, Agent, or Firm*—Lowe, King, Price & Becker

[57] ABSTRACT

A digital signal of data and synchronization words is distributed to a plurality of circuit paths and transformed into non-return-to-zero inverted (NRZI) signals for application to a plurality of stationary parallel magnetic heads for recording the distributed NRZI signals along first parallel tracks on a magnetic tape when driven toward one end thereof and along second parallel tracks interleaved with the first tracks when the tape is driven toward the other end thereof. Each of the transducers has a differential characteristic with which the recorded signal is detected as a ternary signal, the detected signal is converted to a binary signal to recover the original digital signal. The synchronization word is detected from the recovered digital signal to generate a timing signal indicative of the position of each binary digit of the data word with respect to the detected synchronization word. In response to the timing control signal the timing of each binary digit derived from each transducer is aligned with those derived from the other transducers and arranged into a series of successive data words for conversion to an analog signal.

11 Claims, 9 Drawing Figures

MULTI-TRACK DIGITAL RECORDING AND PLAYBACK SYSTEM

BACKGROUND OF THE INVENTION

This invention relates to a digital recording and playback system in which digital signals of non-return-to-zero inverted format are recorded at high density using a plurality of stationary magnetic heads.

In digital recording systems known in the art, audio signals are translated to PCM signals and then organized into a sequence of blocks each comprising digital words of data and synchronization and digital words of error detection and correction. The binary digits of the organized signal are of non-return-to-zero (NRZ) format. However, due to the fact that the clock component of the NRZ signal tends to vary with the contents of the data word, the clock information would be lost if a sequence of zero's continues. A transformation technique is currently employed to transform the original non-return-to-zero (NRZ) signal into a form which contains a sufficient amount of clock information to make it highly likely that binary digits are reproduced in correct clock timing.

On the other hand, the use of conventional 3.81-mm width tapes and conventional stationary heads having a minimum gap of 0.3 micrometers imposes limitation on recording density although high tape-speed operations would solve the density problem.

Known transformation techniques include modified frequency modulation (MFM), 3-position modulation (3PM), and group-coded recording (GCR). Since MFM or 3PM transformed, self-clocked signals have a wide frequency spectrum containing a substantial amount of energy the very low frequency range near DC and in the high frequency range, conventional recording systems having a typical tape speed of 7.1 cm/sec suffer from cross-talk due to leakage flux between adjacent recording heads, with the result that the reproduced waveform is contaminated with noise and the error rate increases considerably in the high frequency range. Moreover, these problems are compounded by the fact that due to the differential characteristic the magnetic head produces a ternary signal rather than a binary signal, making it difficult to achieve high density recording.

SUMMARY OF THE INVENTION

The present invention contemplates the elimination of the above-mentioned problems by transforming the digital signal into a non-return-to-zero inverted (NRZI) signal, distributing the signal to a plurality of parallel stationary heads and detecting the sync word for clock regeneration and permits high density recording along a first set of multiple tracks of a magnetic tape when driven toward one end thereof and along a second set of multiple tracks interleaved with the first tracks when the tape is driven toward the other end thereof.

According to the invention, the digital recording and playback system comprises means for converting an analog signal to a digital signal comprising a data word and a synchronization word, means for distributing the digital signal to a plurality of circuit paths, means for transforming the digital signal on each circuit path into a non-return-to-zero inverted (NRZI) signal, a plurality of stationary parallel electromagnetic transducers respectively associated with the circuit paths and spaced apart at least by the width of a track for recording the distributed NRZI signals along a plurality of longitudinally extending first tracks of a magnetic tape when the tape is driven toward one end thereof and along a plurality of longitudinally extending second tracks interleaved with the first tracks when the tape is driven toward the other end thereof, each of the transducers having a differential characteristic with which the recorded signal is detected as a waveform having three significant levels when the system operates in a playback mode, means coupled to the transducers for converting the waveform to a binary signal to recover the original digital signal, means for detecting the synchronization word from the recovered digital signal to generate a timing signal indicative of the position of each binary digit of the data word with respect to the detected synchronization word, means responsive to the timing control signal for aligning the timing of each binary digit derived from each transducer with those derived from the other transducers, means for arranging the time-aligned data words into a series of successive data words, and means for converting the series of data words to an analog signal.

The invention permits the use of conventional tape recording mechanisms to attain a high recording density that allows the signal to be recorded at a rate of as high as 2 Megabits per second.

BRIEF DESCRIPTION OF THE DRAWINGS

The present invention will be described in further detail with reference to the accompanying drawings, in which.

DETAILED DESCRIPTION

Figure 1:
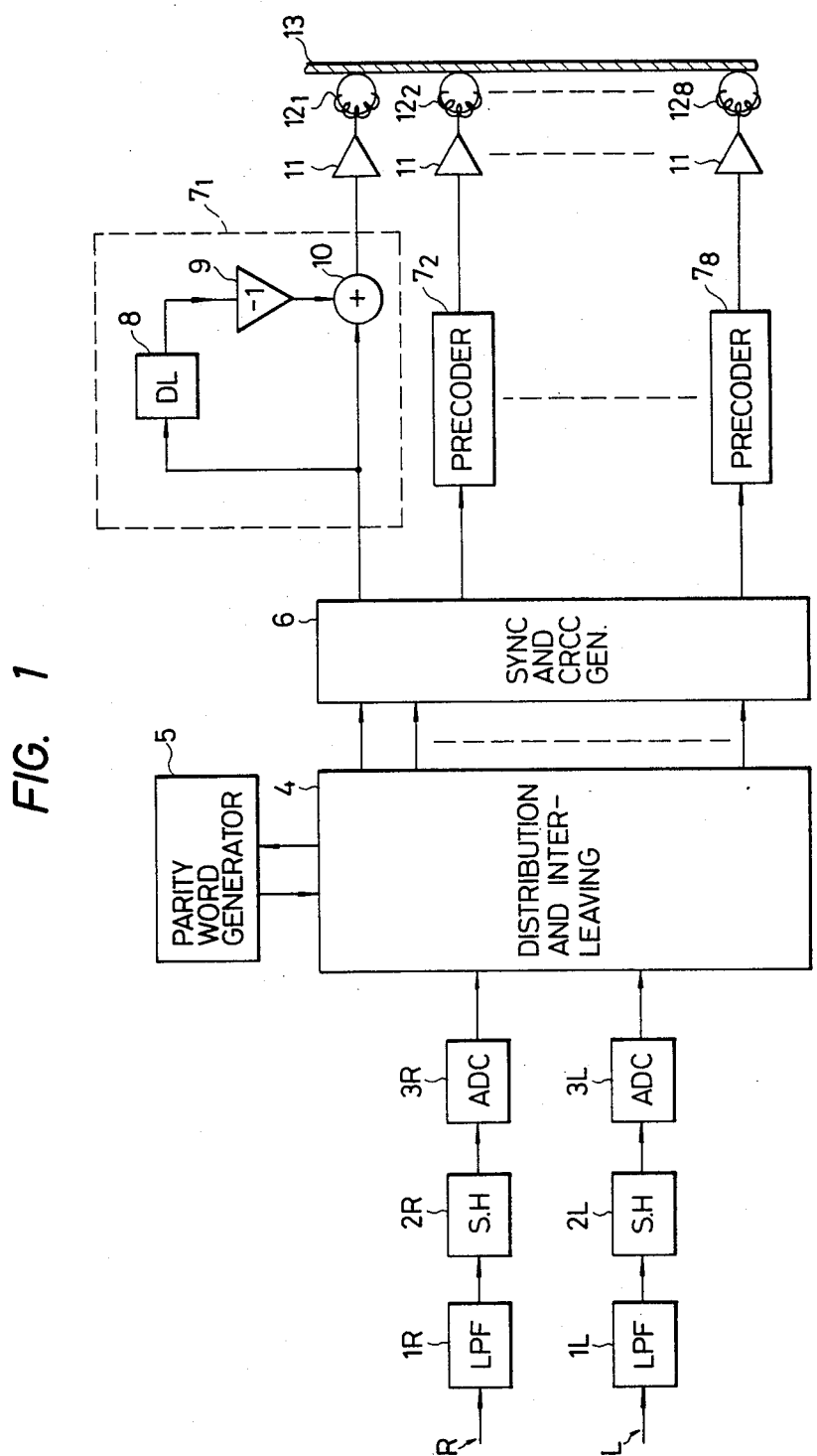
FIG. 1 is an illustration of a digital recording system of the invention.

Referring now to FIG. 1, there is shown a preferred embodiment of the digital recording system of the present invention. Analog stereophonic signals are applied to right and left channels of the system. The right channel signal R is applied to a low-pass filter 1R where the bandwidth is limited to one-half the sampling frequency at which the audio signal is sampled in a sample-hold circuit 2R in a known manner; the sampled value being converted to a corresponding digital value in an analog-digital converter 3R to generate a pulse code modulated (PCM) signal, or a sequence of data words. Similarly, the left channel signal L is processed through an identical circuit comprising a low-pass filter 1L, a sample-hold circuit 2L, and an analog-digital converter 3L.

Figure 2:
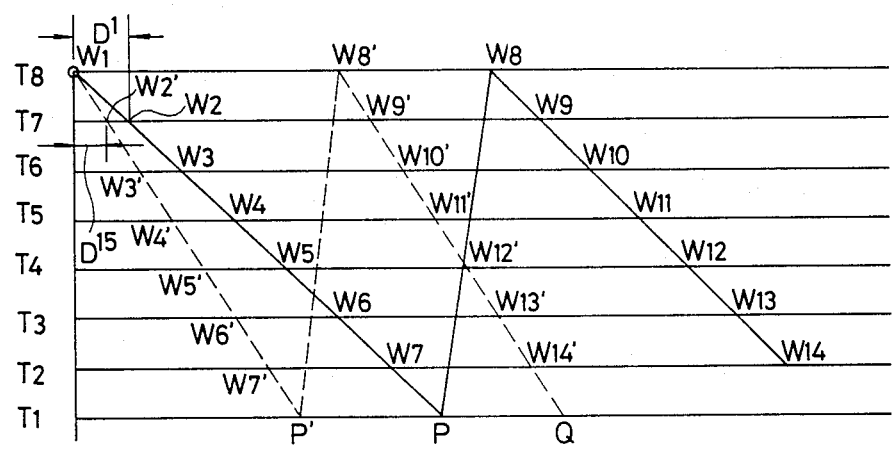
FIG. 2 is a schematic illustration of a recording pattern.

The right and left channel PCM data words are applied to a distribution and interleaving circuit 4 in which the data words of each audio channel are distributed to a number of circuit paths that correspond to parallel tracks (which, in this embodiment, is eight) on a recording tape and then interleaved with the distributed data words of the other audio channel. A parity word generator 5 is coupled to the interleaving circuit 4 to generate P and Q parity words according to the following Equations:

$$P = D^1 W_1 \oplus D^2 W_2 \oplus \ldots \oplus D^{14} W_{14}$$

$$Q = D^{15} W_1' \oplus D^{16} W_2' \oplus \ldots \oplus D^{28} W_{14}' \oplus D^{29} P'$$

where, $D^1$ to $D^{14}$ represent delays A and $D^{15}$ to $D^{29}$ represent delays B, $W_1$ to $W_{14}$ and $W_1'$ to $W_{14}'$ represent data words, and the symbol $\oplus$ represents modulo-2 summation. The data words are sufficiently spaced apart on record tracks to make it highly unlikely that more than one data word will be affected by the same dropout defect and the redundant parity words are recorded on a track adjacent to an edge of the tape which is more subject to noise and fluctuation than the inner tracks, one example being shown in FIG. 2. The interleaved signals are applied to a frame sync and CRC generator 6. The data and parity words of each track are assembled with a frame synchronization word (00110110) to form a block, or frame to which is appended a cyclic redundancy check word derived from the data words of each frame in a well known manner by a generator polynomial.

The assembled digital words for each track, which are of non-return-to-zero format, are supplied to a respective precoder 7, for simplicity only one precoder being shown in detail. The precoder $7_1$ comprises a one-bit delay element 8, an inverter 9 and an adder 10 having a first input connected to receive the NRZ input signal directly from the generator 6 and a second input connected to receive a one-bit delayed, inverted NRZ signal passing through the delay element 8 and inverter 9.

Figure 3:
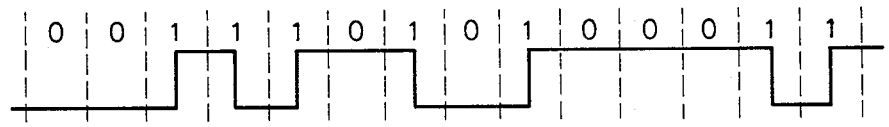
FIG. 3 is an illustration of the waveform of a non-return-to-zero inverted signal.
Figure 5:
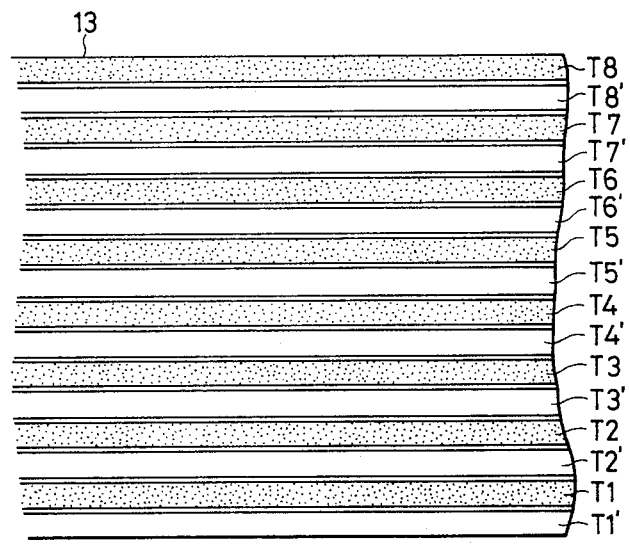
FIG. 5 is an illustration of a track pattern.

Each of the precoders 7 has a characteristic known as "partial response" which serves to convert the input NRZ signal to a non-return-to-zero inverted (NRZI) signal. More specifically, the output of the precoder $7_1$ changes its pulse level from "0" to "1" or vice versa depending on the previous pulse level in response to the occurrence of each "1" bit of input NRZ signal and retains the pulse level when the input signal is "0", as shown in FIG. 3. The outputs of the precoders $7_1$ to $7_8$, after having been amplified by amplifiers 11, are supplied to respective transducer heads $12_1$ to $12_8$ of the in-line gap type which are arranged in parallel across the width of a magnetic tape 13 and spaced apart at least by the width of a track to record the NRZI signals along tracks T1 to T8 parallel to the length of the tape when driven toward one end thereof and along tracks T1' to T8' when the tape is driven toward the other end thereof as illustrated in FIG. 5. Each track has a width of typically 150 micrometers and is spaced from adjacent tracks by a guard band of typically 40 micrometers. A typical value of recording density is 46.3 kilobits per inch. Since the recorded NRZI signal has no DC component, the interference between adjacent magnetic heads is minimized.

Figure 6:
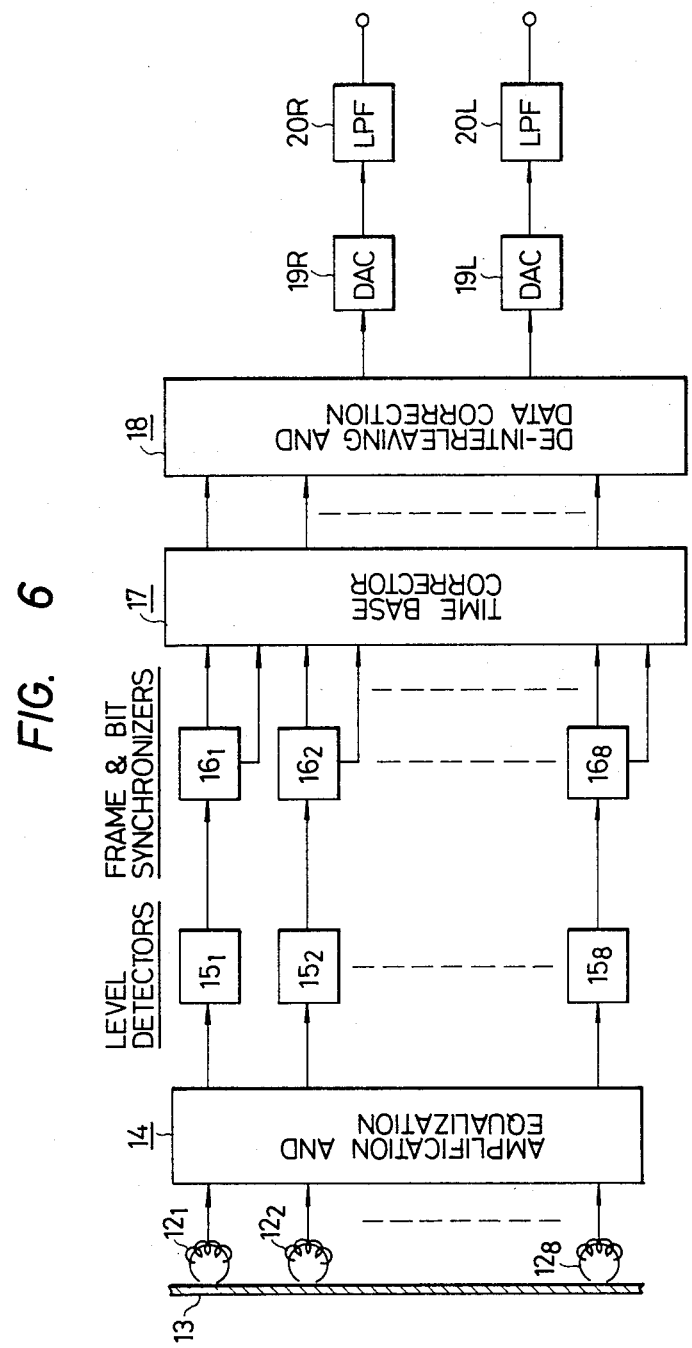
FIG. 6 is an illustration of a playback system of the invention.

FIG. 6 is an illustration of the playback section of the system. The magnetic heads $12_1$ to $12_8$ are used in reproducing the recorded signals. These magnetic heads have a differential characteristic with which the signal is differentiated upon reproduction. As a result, the output of each transducer head is a ternary signal rather than binary as shown at a in FIG. 8. The signals detected by the heads $12_1$ to $12_8$ are fed to a circuit 14 for amplification and equalization and thence to level detectors $15_1$ to $15_8$, respectively. Each level detector is arranged to detect the levels of the ternary signals and provide a pulse in response thereto. The outputs of the level detectors $15_1$ to $15_8$ are fed to frame and bit synchronizers $16_1$ to $16_8$ to recover the original binary signals and derive control timing pulses for use in a time base corrector 17.

Figure 4:
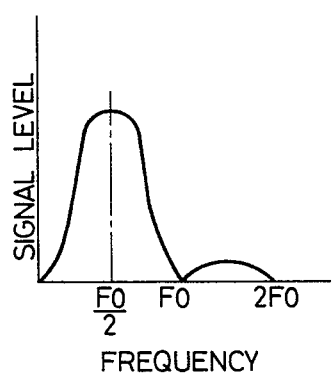
FIG. 4 is an illustration of the frequency spectrum of the NRZI signal.
Figure 7:
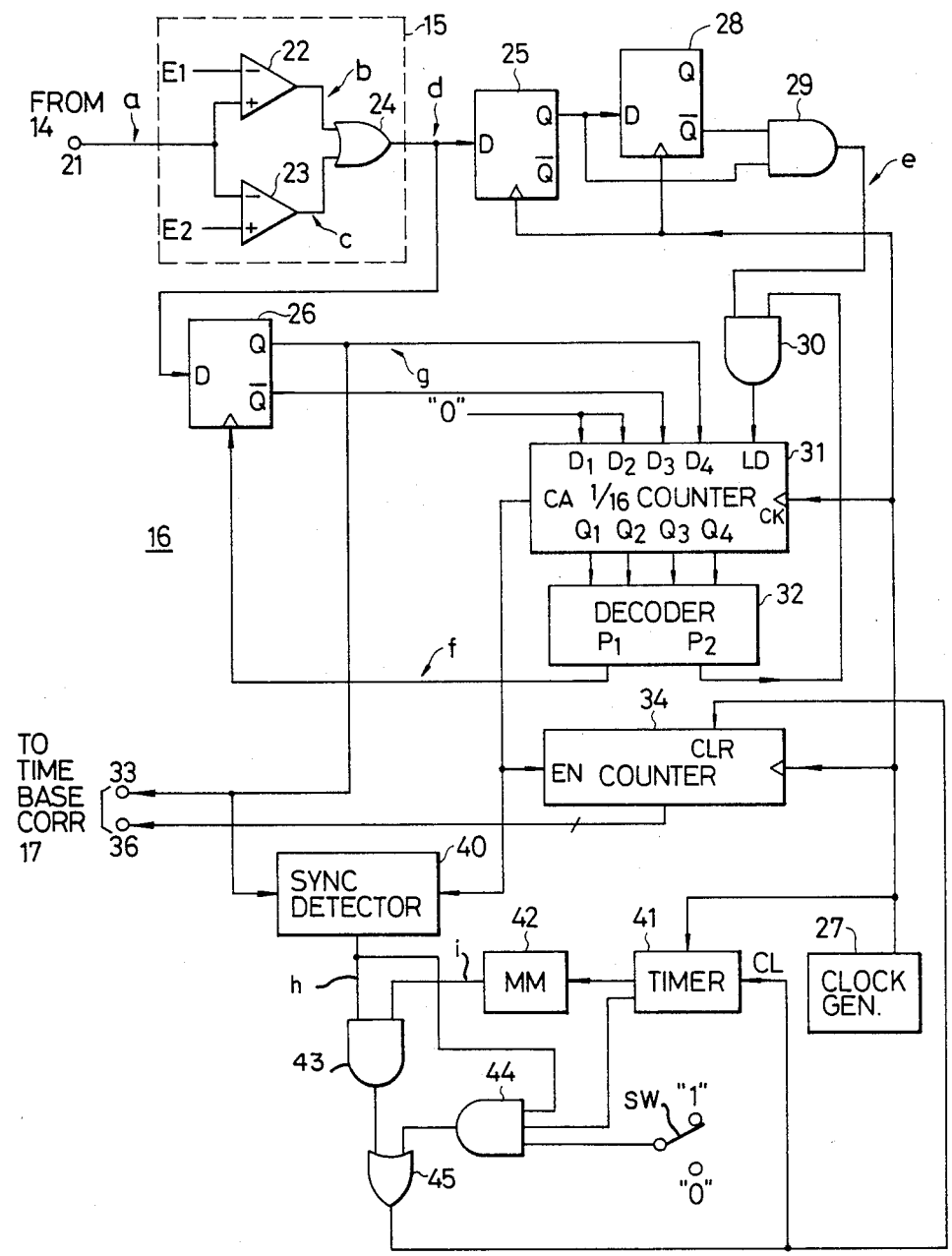
FIG. 7 is an illustration of details of a level detector and a data readout circuit of FIG. 6.
Figure 8:
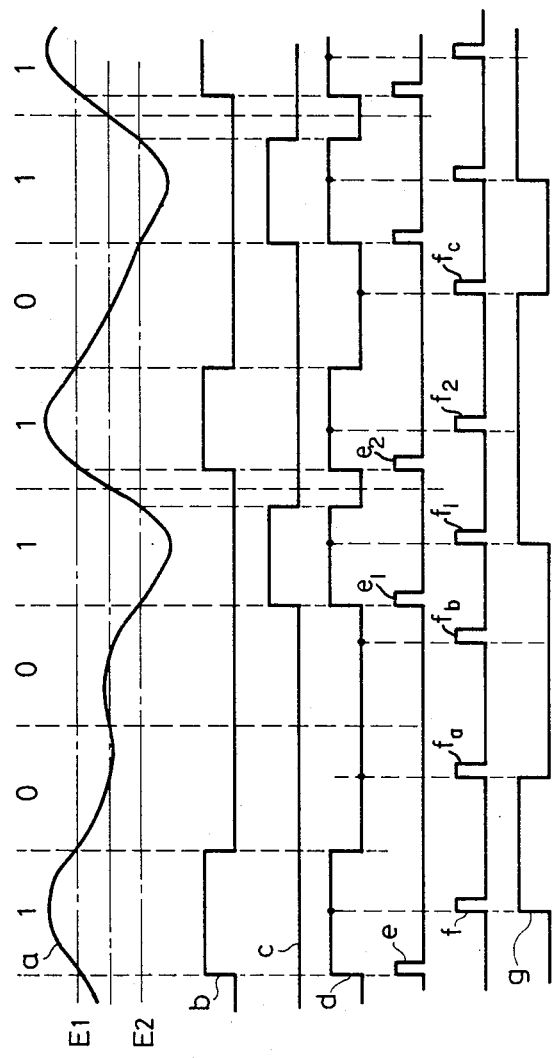
FIGS. 8 and 9 are illustrations of timing diagrams associated with the circuit of FIG. 7.

Details of the level detector and frame and bit synchronizer are shown in FIG. 7. The level detector 15 comprises a pair of comparators 22 and 23 and an OR gate 24 having its inputs coupled respectively to the outputs of the comparators 22 and 23. The noninverting and inverting inputs of the comparators 22 and 23 are coupled together to an input terminal 21 to which an output signal a (FIG. 8) from the circuit 14 is applied. The frequency spectrum of the signal a of FIG. 8 is shown at FIG. 4. The ternary signal a compared with a reference voltage $E_1$ in the comparator 22 to provide pulses b when the input level is higher than E1 and compared with a reference voltage $E_2$ in the comparator 23 to provide pulses c when the input level is lower than E2. Pulses b and c are combined in the OR gate 24 to generate a train of pulses d. The pulses d are applied to the data terminals of D-type flip-flops 25 and 26. As can be seen, the output pulses d more quickly rise to a high voltage level when the ternary waveform a changes from "0" to "1" and delay before rising to the high level when changing from a given "1" binary level to the next "1" binary level.

The D-type flip-flop 25 has its Q output terminal connected to the data terminal of a D-type flip-flop 28 and the flip-flops 25 and 28 have their clock terminals connected together to a clock pulse source 27 to receive clock pulses at a rate which is 16 times higher than the data bit rate. The Q output of the flip-flop 25 and the complementary output of the flip-flop 28 are connected to an AND gate 29 to generate narrow pulses e in response to the leading edge transition of pulses d as shown in FIG. 8.

A divide-by-16 counter 31 is provided having a clock input CK, data input terminals D1 to D4, a load command input terminal LD, a carryover output terminal CA and binary output terminals Q1 to Q4. The data input terminal D1 is a least significant bit position, which together with the next higher bit terminal D2 are coupled to a source that provides a binary "0" potential, and the data input terminals D3 and D4 are respectively coupled to the complementary and true outputs of the flip-flop 26. The counter 31 has its clock input CK coupled to the clock source 27 to increment its count to cause an output pulse to occur on terminal CA at a rate corresponding to the data bit rate, this output pulse being applied to the enable terminal EN of a counter 34. The binary output terminals Q1 to Q4 are coupled to the corresponding input terminals of a decoder 32 having output terminals P1 and P2. The output of AND gate 29 and the terminal P2 of the decoder 32 are coupled by an AND gate 30 to the load terminal LD of the counter 31 to set the data input terminal D3 or D4 to decimal 4 or 8 respectively. The divide-by-16 counter 31 is set to a decimal "4" in response to a pulse $e_1$ when the previous binary level of the waveform a is "∅" and initialized to a decimal "8" in response to a pulse $e_2$ if the previous level is "1". This is to compensate for the difference in rise time as mentioned above so that it ensures that the D-type flip-flop 26 read its data during the period of each data bit.

Decoder 32 provides a trigger pulse f on terminal P1 to the clock input of the D-type flip-flop 26 when the count value reaches a decimal "1 ", for example. Count operation starts in counter 31 in response to pulse $e_1$ so that the count begins with decimal 4 and terminates at decimal 11 when waveform a is previously "∅", while it starts with decimal 8 in response to pulse $e_2$ and terminates at decimal 11 when wave a is previously "1". Thus, a trigger pulse $f_1$ occurs at a time delayed by an interval corresponding to a count of decimal 7 and a trigger pulse $f_2$ occurs at a time delayed by an interval corresponding to a count of decimal 3. In the absence of initializing pulse e, count operation continues, incrementing the count value to decimal 15 and then to decimal ∅ to increase the count again and repeating this process indefinitely. Thus, in the absence of pulses d, trigger pulses $f_a$, $f_b$, and $f_c$ are generated by decoder 32 each time decimal 11 is reached in counter 31 at times delayed by an equal interval corresponding to a count of decimal 16 with respect to their respective preceding trigger pulses f. It is appreciated that trigger pulses $f_1$, $f_2$ occur at times delayed an variable period with respect to the leading edge of pulses $d_1$ and $d_2$, respectively, which period is substantially equal to one half the constant intervals between pulses $f_a$ and $f_b$ and between $f_2$ and $f_c$ when Q output of flip-flop 26 is low and which period is smaller than one half these intervals when the Q output is high. As is seen from FIG. 8, the intervals between trigger pulses $f_a$ and $f_b$ and between $f_2$ and $f_c$ are equal to the period that determines the transmission bit rate of the input data a. The Q output of flip-flop 26 changes to the binary state of the pulse d in response to the pulse f to provide pulses g to an output terminal 33 and to the data terminal D4 of counter 31. The decoder 32 provides a high level signal from terminal P2 to the AND gate 30 during the interval when the count value of counter 31 is within the range of from a decimal "2" to a decimal "10", for example, to eliminate errors which would otherwise result from the level fluctuation of the input signal.

The counter 34, when enabled, starts counting clock pulses from source 27 at correct timing to generate a timing control binary output on terminals 36 indicating the location of each data bit with respect to the beginning of the data block to which the data bit belongs. The contents of the counter 34 are cleared in a manner described hereinbelow.

Since the ternary waveform a does not lends itself to regenerating clock pulses because of the inherent nature of the NRZI signal. In order to establish a valid timing for timing control purposes, the system repeatedly detects the occurrences of frame sync words by including a sync detector 40, a timer 41, a monostable multivibrator 42 and a logic circuit formed by AND gates 43, 44 and an OR gate 45. The sync detector 40 essentially comprises a shift register and a logic gate coupled to the internal stages of the register. The shift register is arranged to accept the output pulse g from flip-flop 26 and shift its contents in response to the output on terminal CA of the divide-by-16 counter 31 to detect a sync word when it corresponds to the bit pattern defined by the logic circuit. From the logic circuit is generated a pulse h as shown in FIG. 9.

Figure 9:
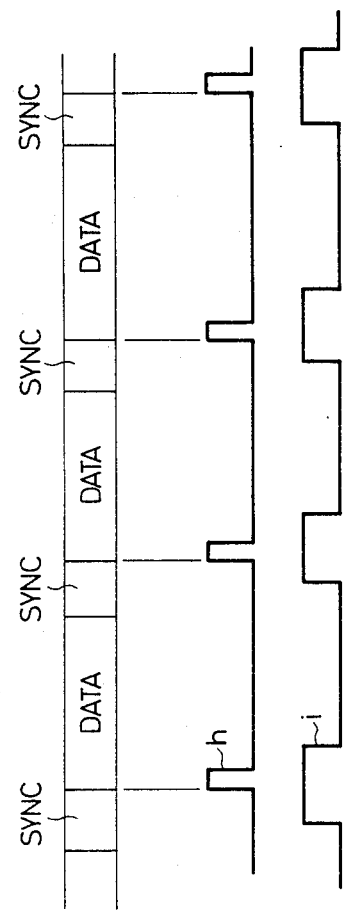

Timer 41 is arranged to count the clock pulse to provide a timing pulse at frame intervals to a monostable multivibrator 42 to cause it to produce a window gate pulse i as illustrated in FIG. 9 for application to an AND gate 43 to which the pulse h is also applied. By application of the window gate pulses, only those of the detected pulses h which are valid for clock timing are passed through OR gate 45 to the clear terminals of the counter 34 and the timer 41.

A manually operated transfer switch SW is connected to an input of AND gate 44 to which the outputs of the sync detector 40 and timer 41 are also applied. The switch SW is normally connected to a "0" bit position and switched to a "1" bit position when the system is operated. With the switch SW being transferred to the "1" position, the AND gate 44 is enabled to pass an output pulse upon coincidence between a pulse h and a timing pulse from the timer 41, the coincidence output being used to clear the timer 41 during starting periods. Once the system is synchronized, a logical "0" is applied to the AND gate 44 by switching the switch SW to the "0" position to allow the timer 41 to be cleared in response to the output of AND gate 43.

In this way, the counter 34 is cleared in valid timing with respect to the input signal and the timing control signal on terminal 36 is indicative of the correct location of each data bit. Clock timing is thus achieved with a high degree of stability not attainable with conventional systems.

The signals on terminals 33 and 36 are applied to the time base corrector 17. The time base corrector 17 essentially comprises one or more memories in which the data bits from the frame and bit synchronizers $16_1$ to $16_8$ are stored and read out the memories in accordance with the timing control signals on terminals 36 to compensate for any difference in timing which might occur between signals from tracks as a result of a tape being skewed with respect to the aligned heads.

The outputs of the time base corrector 17 are then applied to a de-interleaving and error correction circuit 18 where data bits in errors, if any, are replaced by correct ones using CRC, P and Q parity words and the parallel data streams are de-interleaved into the original data. The de-interleaved data words are then fed to digital-analog converters 19R, 19L, and low-pass filters 20R and 20L to recover the original right and left channel signals.

What is claimed is:

1. A digital recording and playback system comprising:
   means for converting an analog signal to a digital signal comprising a data word and a synchronization word;
   means for distributing said digital signal to a plurality of circuit paths;
   means for transforming the digital signal in each of said circuit paths into a non-return-to-zero inverted (NRZI) signal;
   delay means for delaying said digital signal by a period of one binary digit for producing a delayed digital signal,
   said transforming means comprising adder means for combining said digital signal with said delayed digital signal;
   means for inverting said delayed digital signal for applicaation to said adder means for combination with said digital signal;
   a plurality of stationary parallel electromagnetic transducers respectively associated with said circuit paths and spaced apart at least by the width of a track for recording the distributed NRZI signals along a plurality of spaced apart longitudinally extending first tracks of a magnetic tape when the tape is driven toward one end thereof and along a plurality of spaced apart longitudinally extending second tracks interleaved with said first tracks when the tape is driven toward the other end thereof, each of said transducers having a differential characteristic with which the recorded signal is detected as a waveform having three distinguishable levels when the system operates in a playback mode;

means coupled to said transducers for converting said waveform to a binary signal to recover the original digital signal;

means for detecting said synchronization word from the recovered digital signal to generate a timing signal indicative of the position of each binary digit of the data word with respect to the detected synchronization word;

means responsive to said timing signal for aligning the timing of each binary digit derived from each transducer with binary digits derived from the other transducers;

means for arranging said time-aligned data words into a series of successive data words; and means for converting said series of data words to an analog signal.

2. A digital recording and playback system as claimed in claim 1, wherein said means for converting the waveform to a binary signal comprises means for detecting when said waveform is higher than an upper predetermined level to produce a first pulse and when said waveform is lower than a lower predetermined level to produce a second pulse, and wherein said synchronization detecting means comprises means for generating clock pulses at a rate higher than the rate at which the binary digit of each data word occurs, means arranged to initiate counting the clock pulses in response to the leading edge of each of said first and second pulses and generating a trigger pulse within the interval of each binary digit of the data word, and a triggered bistable device having an input terminal in receipt of said first and second pulses for generating an output which changes its level to the level of said input terminal in response to said trigger pulse.

3. A digital recording and playback system as claimed in claim 1, wherein said analog signal comprises a pair of stereophonic signals, and wherein said means for distributing comprises means for interleaving the data words of each stereophonic signal with the data words of the other stereophonic signal, and wherein said means for arranging comprises means for de-interleaving the time-aligned data words.

4. A digital recording and playback system comprising:

means for converting analog signals of different channels to digital data words;

means for deriving parity words from the data words;

means for distributing the data words and parity words of each channel to a plurality of circuit paths and interleaving the distributed data and parity words derived from each channel with the data and parity words derived from another channel;

means for generating a sync word and cyclic redundancy check word and appending the sync and check words to the data and parity words on each circuit path to form a frame;

means for transforming the frame on each circuit path into a non-return-to-zero inverted (NRZI) signal having a predetermined bit rate;

a plurality of parallel electromagnetic transducers stationarily mounted with respect to a magnetic tape and respectively coupled to said circuit paths for recording a baseband of NRZI signals along each of a plurality of first parallel tracks when the tape is transported in a first direction and along each of a plurality of second parallel tracks when the tape is driven in a second, opposite direction, each of said transducers further operable for detecting the recorded signals, each of said transducers having a differential characteristic whereby a waveform having three distinguishable levels is detected by each transducer;

a plurality of level detectors coupled respectively to said transducers, each level detector comprising means for detecting said waveform having an amplitude greater than a higher threshold to generate a first pulse and for detecting said waveform having an amplitude smaller than a lower threshold to generate a second pulse;

a plurality of synchronizers coupled respectively to said level detectors, each synchronizer comprising:

a bistable device having a first input terminal connected to receive said first and second pulses and a second input terminal connected to receive a trigger pulse, said bistable device generating an output which changes to a binary level at said first input terminal in response to said trigger pulse;

means for generating a first trigger pulse at a time, variably delayed by a first time period from the leading edge of each of said first and second pulses and a second trigger pulse at a time, delayed by a second time period from either the time of occurrence of said first trigger pulse in the presence of either said first and second pulses or at a time delay from the time of occurrence of a preceding second trigger pulse in the absence of said first and second pulses, said second time period being equal to the period that determines said predetermined rate, said first time period being variable between a first value smaller than half said second time period when the output of said bistable device is at a first binary level and a second value substantially equal to half said second time period when the output of said bistable device is at a second binary level, said first and second trigger pulses being applied to said second input terminal of said bistable device; and means for detecting said sync word in the output of said bistable device and generating a timing signal indicative of the position of each of the binary digit that comprise said data and parity words on each circuit path with respect to said sync word;

means responsive to the output of the bistable device of each synchronizer and operable in response to the timing signal of each synchronizer, for generating binary signals on said circuit paths so that the binary signal on each circuit path is time-coincident with the binary signal on another circuit path;

means for de-interleaving said time-coincident binary signals; and means for converting said de-interleaved binary signals to analog signals on different channels.

5. A digital recording and playback system as claimed in claim 4, wherein said trigger pulse generating means comprises means for generating clock pulses at a rate higher than said predetermined bit rate, and binary counter means having a series of counter stages, the counter means being resettable in response to the leading edge of said first and second pulses to a first or a second initial value depending on the binary level of the output of said bistable device and arranged to count said clock pulses, and means for decoding the binary states of said counter stages and generating a first counter output as said first trigger pulse when a predetermined one of the counter stages is reached, said counter means being arranged to repeat count operation through said counter stages for generating a second counter output as said second trigger pulse at equal intervals.

6. A digital recording and playback system as claimed in claim 4, wherein said first parallel tracks are interleaved with said second parallel tracks.

7. A digital recording and playback system comprising:
- means for converting analog signals of different channels to digital data words;
- means for distributing the data words of each channel to a plurality of circuit paths and interleaving the distributed data words derived from each channel with the distributed data words derived from another channel;
- means for generating a sync word and appending the sync word to the data word on each circuit path to form a frame;
- means for transforming the frame on each circuit path into a non-return-to-zero inverted (NRZI) signal having a predetermined bit rate;
- a plurality of parallel electromagnetic transducers stationarily mounted with respect to a magnetic tape and respectively coupled to said circuit paths for recording a baseband of the NRZI signals along each of a plurality of first parallel tracks when the tape is transported in a first direction and along each of a plurality of second parallel tracks when the tape is driven in a second, opposite direction, each of said transducers further operable for detecting the recorded signals, each of said transducers having a differential characteristic whereby a waveform having three distinguishable levels is detected by each transducer;
- a plurality of level detectors coupled respectively to said transducers, each level detector comprising means for detecting said waveform having an amplitude greater than a higher threshold to generate a first pulse and for detecting said waveform having an amplitude smaller than a lower threshold to generate a second pulse;
- a plurality of synchronizers coupled respectively to said level detectors, each synchronizer comprising:
- a bistable device having a first input terminal connected to receive said first and second pulses and a second input terminal connected to receive a trigger pulse, said bistable device generating an output which changes to a binary level at said first input terminal in response to said trigger pulse;
- means for generating a first trigger pulse at a time, variably delayed by a first time period from the leading edge of each of said first and second pulses and a second trigger pulse at a time, delayed by a second time period from either the time of occurrence of said first trigger pulse in the presence of either said first and second pulses or at a time delay from the time of occurrence of a preceding second trigger pulse in the absence of said first and second pulses, said second time period being equal to the period that determines said predetermined rate, said first time period being variable between a first value smaller than half said second time period when the output of said bistable device is at a first binary level and a second value substantially equal to half said second time period when the output of said bistable device is at a second binary level, said first and second trigger pulses being applied to said second input terminal of said bistable device; and
- means for detecting said sync word in the output of said bistable device and generating a timing signal indicative of the position of each of the binary digit that comprise said data word on each circuit path;
- means responsive to the output of the bistable device of each synchronizer and operable in response to the timing signal of each synchronizer, for generating binary signals on said circuit paths so that the binary signal on each circuit path is time-coincident with the binary signal on another circuit path;
- means for de-interleaving said time-coincident binary signals; and
- means for converting said de-interleaved binary signals to analog signals on different channels.

8. A digital recording and playback system as claimed in claim 7, wherein said trigger pulse generating means cmprises means for generating clock pulses at a rate higher than said predetermined bit rate, and binary counter means having a series of counter stages, the counter means being resettable in response to the leading edge of said first and second pulses to a first or a second initial value depending on the binary level of the output of said bistable device and arranged to count said clock pulses, and means for decoding the binary states of said counter stages and generating a first counter output as said first trigger pulse when a predetermined one of the counter stages is reached, said counter means being arranged to repeat count operation through said counter stages for generating a second counter output as said second trigger pulse at equal intervals.

9. A digital recording and playback system as claimed in claim 7, wherein said first parallel tracks are interleaved with said second parallel tracks.

10. An apparatus for reading digital signals comprising data bits of different channels and frame sync words recorded on different tracks of a magnetic tape in a non-return-to-zero inverted (NZRI) format with binary digits occurring at a predetermined bit rate, said data bits on each channel being distributed on said tracks and interleaved with the data bits of another channel, each of said sync words appending to a group of data bits on each track, comprising:
- a plurality of parallel electromagnetic transducers stationarily mounted with respect to said tape and associated respectively with said tracks, each of said transducers having a differential characteristic whereby the recorded binary digits are detected as a waveform having three distinguishable levels;
- a plurality of level detectors coupled respectively to said transducers, each level detector comprising means for detecting said waveform having an amplitude greater than a higher threshold to generate a first pulse and for detecting said waveform having an amplitude smaller than a lower threshold to generate a second pulse;
- a plurality of synchronizers coupled respectively to said level detectors, each synchronizer comprising:
- a bistable device having a first input terminal connected to receive said first and second pulses and a second input terminal connected to receive a trigger pulse, said bistable device generating an output which changes to a binary level at said first input terminal in response to said trigger pulse;

means for generating a first trigger pulse at a time, variably delayed by a first time period from the leading edge of each of said first and second pulses and a second trigger pulse at a time, delayed by a second time period from either the time of occurrence of said first trigger pulse in the presence of either said first and second pulses or at a time delay from the time of occurrence of a preceding second trigger pulse in the absence of said first and second pulses, said second time period being equal to the period that determines said predetermined rate, said first time period being variable between a first value smaller than half said second time period when the output of said bistable device is at a first binary level and a second value substantially equal to half said second time period when the output of said bistable device is at a second binary level, said first and second trigger pulses being applied to said second input terminal of said bistable device; and means for detecting said sync word in the output of said bistable device and generating a timing signal indicative of the position of each of the binary digits with respect to the position of said frame sync word;

means responsive to the output of the bistable device of each synchronizer and operable in response to the timing signal of each synchronizer, for generating binary digits on plural channels so that the binary digits on each channel is time-coincident with the binary digits on the other channels;

means for de-interleaving said time-coincident binary digits to recover original data bits of different channels; and means for converting said de-interleaved binary digits to analog signals of different channels.

11. An apparatus as claimed in claim 10, wherein said trigger pulse generating means comprises means for generating clock pulses at a rate higher than said predetermined bit rate, and binary counter means having a series of counter stages, the counter means being resettable in response to the leading edge of said first and second pulses to a first or a second initial value depending on the binary level of the output of said bistable device and arranged to count said clock pulses, and means for decoding the binary states of said counter stages and generating a first counter output as said first trigger pulse when a predetermined one of the counter stages is reached, said counter means being arranged to repeat count operation through said counter stages for generating a second counter output as said second trigger pulse at equal intervals.

* * * * *